C. BARRY.
Improvement in Machines for Making Tin-Cans.
No. 4,876. Reissued April 23. 1872.
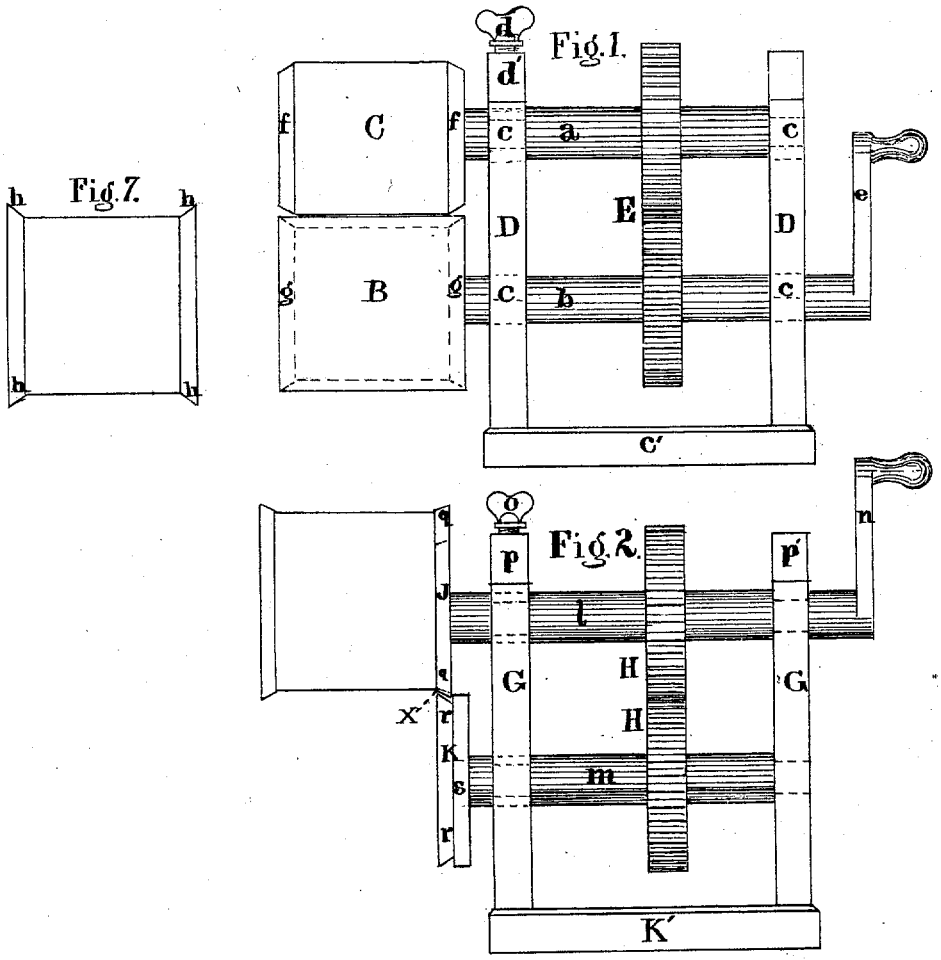
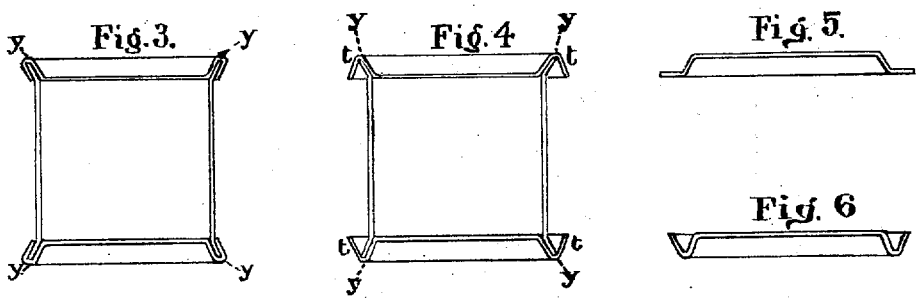
WITNESSES.
James P. Petit
Wm. F. Johnson
INVENTOR.
Christian Barry
AM. PHOTO-LITHOGRAPHIC CO. N.Y. (OSBORNE'S PROCESS.)

UNITED STATES PATENT OFFICE.

CHRISTIAN BARRY, OF PHILADELPHIA, PENNSYLVANIA.

IMPROVEMENT IN MACHINES FOR MAKING TIN CANS.

Specification forming part of Letters Patent No. 71,680, dated December 3, 1867; reissue No. 3,143, dated October 6, 1868; reissue No. 4,876, dated April 23, 1872.

*To all whom it may concern:*

Be it known that I, CHRISTIAN BARRY, of the city and county of Philadelphia and State of Pennsylvania, have invented a new and useful Mode of Manufacturing Cans; and I do hereby declare the following to be a full, clear, and exact description thereof, sufficient to enable others skilled in the art to which my invention appertains to fully understand and use the same, reference being had to the accompanying drawing making part of this specification, in which—

Figures 1 and 2 are side elevations of devices employed in making cans according to my invention. Fig. 3 is a central vertical section of the can. Figs. 4, 5, 6, and 7 show cans and parts of cans in progress of manufacture.

Similar letters of reference indicate corresponding parts in the several figures, which figures are half sized lineally.

My invention has for its object novel means for manufacturing cans from tin and other metals and according to the design for which Letters Patent have been granted me of date November 5, 1867; and consists in a burring or rounding tool for giving the body of the can its shape, and in swages or dies for closing the seam between the top and bottom or covers and the body of said can, as will be hereinafter described more fully.

In carrying out my invention I form the top and bottom of the can by "striking up" a disk of metal so as to assume the shape of a hat having a low crown and a rim in a plane parallel thereto. (See Fig. 5.) This being applied to a "stripping tool" the rim is turned up so as to leave a groove on the upper side of the covers, between it and the "struck up" part, as shown in Fig. 6, which groove is to fit over the edges of the body of the can. The body of the can is formed of a strip or piece of metal, having its longitudinal ends so as to form an unbroken cylinder having the joint at the side and its top and bottom free and open.

Having thus constructed the can it is ready to be applied to the devices shown in the drawing. Fig. 1 represents the burring or rounding tool, consisting of two rolls, B and C, arranged aside of each other and mounted on shafts *a* and *b*, having their bearings in suitable boxes *c* on an upright framing, D, arising from a base, *c'*. The boxes of shaft *a* slide between the uprights and are adjustable by means of a set-screw, *d*, on the cross-piece *d'*, whereby the rolls are advanced to and receded from each other. The shaft *b* has a crank, *e*, at the end opposite to the rolls, by which motion is communicated to shaft *a* by means of the gearing E, and causing the rolls to rotate in opposite directions. The rolls are secured to the shafts on the outside of the frame D. The roll C is of the form of a cylinder, having its edges beveled or chamfered, as at *f*. The roll B has continuous flanges *g* at both ends, which project outwardly in opposite directions at an angle of forty-five degrees, more or less. The bodies of both rolls between the bevel and flanged edges are unbroken, being perfectly cylindrical. The bevel edges of roll C rotate within the flanged edges of roll B. The cylinder or body of the can, as previously described, is now slipped over the roll B, the roll C is advanced thereto, and motion communicated to both rolls. The roll C will firmly press the body of the can against the roller B, so that the said body will assume the form of the latter—that, is the portion of the body at and near its edges is bent or pressed so as to project outwardly, as shown at *h*, Fig. 7. These projecting edges enter the groove on the lower side of the lids or top and bottom of the can. The lids and body should then be put together, and the can, as partly completed, is now ready for the closing tool. Fig. 2 represents the closing tool. K' is a base or foundation, from which arise standards surmounted by cross-pieces or caps *p* and *p'*, forming an upright framing G. In the framing G there are mounted in suitable boxes two shafts, *l* and *m*, each carrying a tooth-wheel, H, meshing into each other. The upper shaft *l* is provided with a crank-handle, *n*, by which power is communicated to the shafts, and may be raised or lowered by the set-screw O in the cap *p*, or by other equivalent means of applying downward pressure. The shafts rotate in opposite directions, and are extended beyond the frame G, and carry the rotary swages or closing-dies J and K. The swage or die J has its periphery beveled outwardly, as shown at *g*. The periphery of the swage or die K is beveled inwardly, as shown at *r*, to about its middle, where the bevel terminates in a shoulder, *s*. As the bevel of the swage J is outward and that of the swage K inward, it is evident that if the two swages were brought together they would come in contact with each other at their edges, to the left side in the drawing, and occupy this position during rotation, and the inner edge of the swage J will bear against the shoulder *s* of swage K. In order to close the seam between the lids or top and bottom and the body of the can I apply the same as shown in Fig. 2—that is, with the projecting edges *t*, Fig. 4, of one end between the peripheries of the swages or dies. The countersunk head or lid lies against the outer face of the swage J. The position of the lid and body will be understood by reference to the section, Fig. 4. The swages being rotated they will cause the can to rotate, and thus bring every part of the seam to the action of both swages. It is desirable that the can should be held up against the swage J, so as to guide it and make the seam uniform throughout.

It will be noticed that the two swages rotating and being almost in contact they will clinch or clamp the parts comprising the joint or seam, so as to lie firmly and closely against each other without any space between them. The parts of the said seam or joint will be found to be so uniformly and smoothly burnished and pressed perfectly tight together that there is no opportunity for ingress or egress of air, water, or any other fluid. Care should be taken in making and adjusting the rotary swages or closing-dies J and K that the compression is greatest at the extreme edges of the dies, at the point marked *x* in Fig. 2, so that the bent portion of metal, marked *y* in Figs. 3 and 4, is relieved of pressure during the operation of closing the ends or heads on the can.

A can constructed according to the above will be found useful for many purposes, especially for alkalies which are put up or packed in a heated state. I dispense entirely with solder in closing the seam or joint between the top or bottom and the body of the can, and therefore claim a great superiority over the old modes of making cans.

Should it be desired to have only the top or bottom flat and without the outwardly-projecting seam, one of the flanges of rolls B must be dispensed with. The top or bottom will then be soldered as usual, but the other top or bottom will undergo the operation hitherto described.

From practical operation my mode is found to produce a can useful, simple, and cheap, with smoothly-burnished head seams.

I do not broadly claim all bevel-edged rollers or rotary swages for closing can-heads irrespective of their construction and application; but

What I claim as new, and desire to secure by Letters Patent, is—

1. The mode of manufacturing cans substantially as herein described.

2. The roll C with beveled edge *f*, and roll B with flange edge *g*, operating together substantially as described, for the purpose specified.

3. The rotating swage or die J having bevel periphery *q*, and rotating swage or die K with its periphery *r s* beveled and having a relief provided for the bent portion of the heads *y*, co-operating as described, for the purpose specified.

CHRISTIAN BARRY.

Witnesses:
JAMES P. PETIT,
WM. F. JOHNSON.